Figure 3:
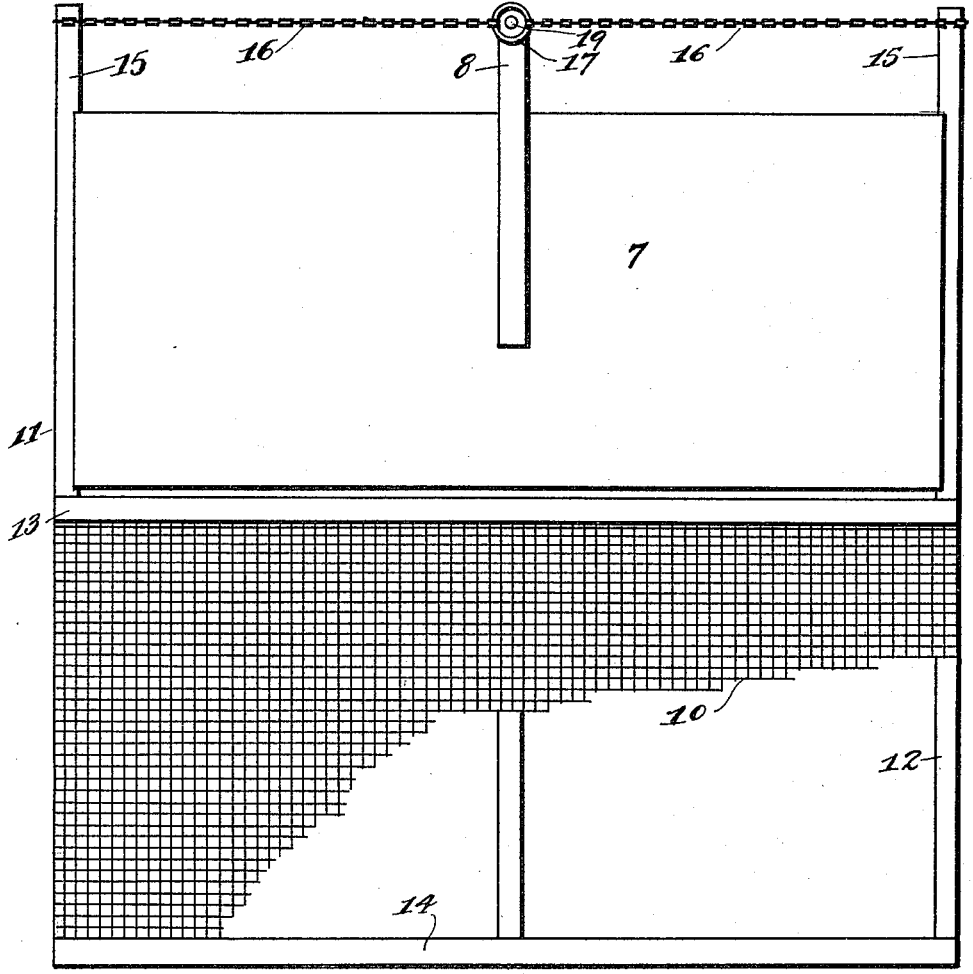

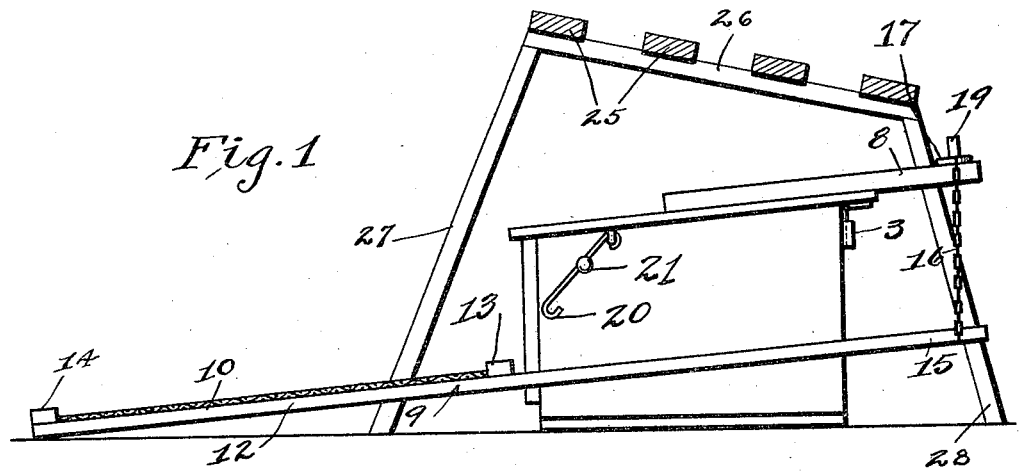
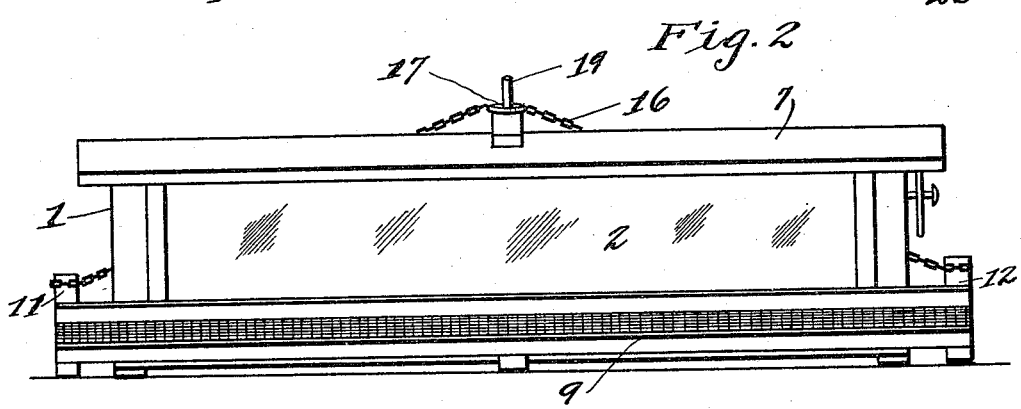
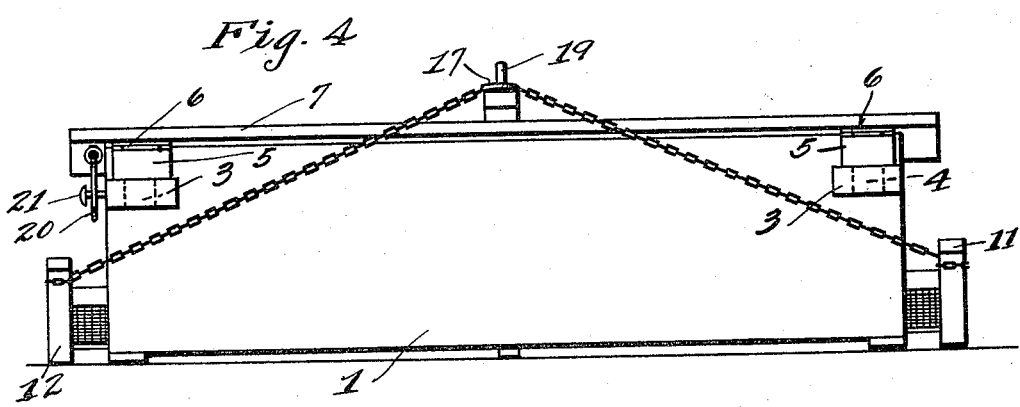

W. J. R. LONG.
POULTRY FEEDER.
APPLICATION FILED JUNE 29, 1914.

1,147,180.

Patented July 20, 1915.
2 SHEETS—SHEET 2.

Inventor
W. J. Russ Long

UNITED STATES PATENT OFFICE.

WILLIAM JOSEPH RUSS LONG, OF APALACHICOLA, FLORIDA.

POULTRY-FEEDER.

1,147,180.  Specification of Letters Patent.  Patented July 20, 1915.

Application filed June 29, 1914. Serial No. 848,015.

*To all whom it may concern:*

Be it known that I, WILLIAM JOSEPH RUSS LONG, a citizen of the United States, residing at Apalachicola, in the county of Franklin and State of Florida, have invented certain new and useful Improvements in Poultry-Feeders; and I do declare the following to be a full, clear, and exact description of the invention, such as will enable others skilled in the art to which it appertains to make and use the same.

My invention relates to improvements in stock and poultry feeders and more particularly to the latter.

The primary object of the invention is to provide a device of the herein described character which may be simply and inexpensively constructed and which will readily perform the functions for which it is designed.

A secondary object of the invention is to so construct the device as to render the various parts thereof readily detachable for the purpose of cleaning.

A still further object is to construct a trip platform, to be described, in such a manner as to allow feed beneath the same, to be readily seen by the poultry.

With these and minor objects in view, the invention resides in certain novel features of construction and combination herein described and claimed and shown in the drawings wherein—

Figure 5:
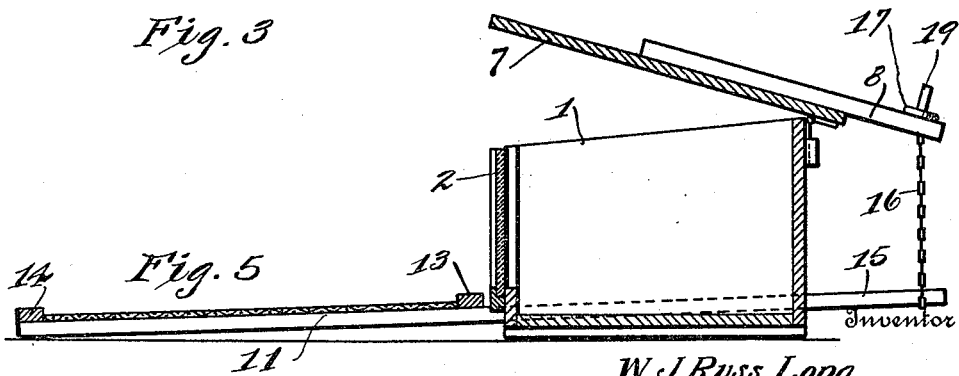

Figure 1 is an end view of my improved poultry feeder. Fig. 2 is a front elevation thereof. Fig. 3 is a top plan view, Fig. 4 is a rear elevation, and Fig. 5 is a transverse sectional view showing the manner in which the cover is raised.

In the embodiment, illustrated in the accompanying drawings, I have shown my improved poultry feeder as including a rectangular feed receptacle 1 which is preferably provided with a transparent panel 2 in its front side, its rear side being provided with a pair of spaced upright keepers 3, the latter being adapted to receive tongues 4 which are formed by shouldering depending leaves 5 of hinges 6, the complimentary parts of said hinges being secured to a cover 7 which is thereby hingedly and removably connected to the receptacle 1. As clearly shown in the accompanying drawings, the cover 7 is provided with a rearwardly extending operating arm 8 the function of which will be herein described.

Disposed in front of the casing 1 is a trip platform 9, said platform being here shown in the form of a rectangular open work frame having a covering 10, preferably of galvanized wire mesh. As shown most clearly in the plan view, the frame comprises front and rear longitudinal bars 14 and 13 respectively, a central transverse bar 11 and transverse end bars 12, the latter extending rearwardly from the bar 12 as indicated at 12. These rearwardly extending portions 15 constitute operating arms for raising the cover 7, said rearwardly extending portions being connected with the rear end of the arm 8 by means of light chains 16 or other suitable connecting elements, said chains being preferably secured to the rear extremities of the arms 15 and having their inner ends secured to a link or ring 17, the latter being loosely and removably engaged with an upright stud 19 which rises from said arm 8.

When the parts are assembled, the forward ends of the bars 11 and 12 are adapted to rest upon the floor of the poultry house or upon the ground, as the case may be, the rear ends of said bars and the rear edge of the platform 9 being supported above the floor or ground level by means of the chains 16. It will therefore be seen that when the fowls, attracted by the sight of the grain through the transparent panel 2, tread upon the platform 9, their weight will depress the same thus, through the instrumentality of the connecting elements 16, raising the cover 7 and giving access into the interior of the receptacle 1 from which they may now feed.

I have described a covering of wire mesh upon the frame, (said mesh and frame constituting the platform), this provision being made in order that the fowls may be further coaxed by placing feed beneath said platform. It will therefore be seen that the above described operation will take place whether the feed be displayed through the panel 2 or through the wire mesh 10.

Although the elements 16 could be constructed of sufficient length to limit the inward movement of the cover 7, I preferably provide the latter with a depending hook 20 which is adapted to engage a stop 21 carried by one end of the receptacle 1, thus positively limiting the upward movement of said cover.

I have found by actual experience, that when fowls are standing upon the platform 9 with their heads within the receptacle 1, other fowls persist in jumping upon the cover 7 thereby forcing the same downwardly upon the necks and heads of the fowls feeding from said receptacle. In order to overcome this undesirable feature, I employ the construction now to be described and illustrated in Fig. 1.

Spaced a suitable distance above the cover 7 are a number of longitudinal slats 25 whose opposite ends are supported upon downwardly and rearwardly inclining cross-bars 26 of substantially inverted U-shaped supporting frames which are located at opposite ends of the receptacle 1, the front and rear legs 27 and 28 of said frames contacting with the ground or with the floor of the poultry house as the case may be. It is to be understood that the slats 25 extend above the entire length of the receptacle 1 and thereby prevent any fowls from jumping upon the cover 7 when the same is raised.

From the foregoing description, taken in connection with the accompanying drawings, it will be seen that I have produced an extremely simple feeding device which may be inexpensively constructed and which may be easily disassembled for the purpose of cleaning, sterilizing or the like.

Having thus described my invention, what I claim as new and desire to secure by Letters Patent is:

1. The combination with a feed receptacle, a hinged top therefor and a depressible platform for raising said cover to give access into the receptacle, of a guard hood spaced above said cover whereby fowls are prevented from alighting thereon when raised.

2. The combination with a feed receptacle, a hinged cover therefor and a depressible platform for raising said top to give access to the interior of the receptacle, of a number of longitudinal guard slats spaced above said cover, and inverted U-shaped end frames suporting the opposite ends of said slats whereby fowls are prevented from alighting upon said cover when raised.

In testimony whereof I have hereunto set my hand in presence of two subscribing witnesses.

WILLIAM JOSEPH RUSS LONG.

Witnesses:
S. E. TEAGUE,
HARRY G. TAUM.